United States Patent
Kimura et al.

(10) Patent No.: US 10,282,142 B2
(45) Date of Patent: May 7, 2019

(54) IMAGE DISPLAY DEVICE, IMAGE DISPLAY METHOD, AND RECORDING MEDIA HAVING RECORDED THEREON IMAGE DISPLAY PROGRAM

(71) Applicant: SCREEN HOLDINGS CO., LTD., Kyoto-shi, Kyoto (JP)

(72) Inventors: Soichi Kimura, Kyoto (JP); Katsumichi Miyamoto, Kyoto (JP); Kaori Fujii, Kyoto (JP); Tsuyoshi Fukami, Kyoto (JP)

(73) Assignee: Screen Holdings Co., Ltd., Kyoto (JP)

( * ) Notice: Subject to any disclaimer, the term of this patent is extended or adjusted under 35 U.S.C. 154(b) by 0 days.

(21) Appl. No.: 15/753,213

(22) PCT Filed: Mar. 28, 2016

(86) PCT No.: PCT/JP2016/059854
§ 371 (c)(1),
(2) Date: Feb. 16, 2018

(87) PCT Pub. No.: WO2017/038135
PCT Pub. Date: Mar. 9, 2017

(65) Prior Publication Data
US 2018/0239562 A1 Aug. 23, 2018

(30) Foreign Application Priority Data
Sep. 2, 2015 (JP) ................. 2015-172492

(51) Int. Cl.
*G06F 3/12* (2006.01)
(52) U.S. Cl.
CPC .......... *G06F 3/1203* (2013.01); *G06F 3/1237* (2013.01)

(58) Field of Classification Search
None
See application file for complete search history.

(56) References Cited

U.S. PATENT DOCUMENTS

2003/0117425 A1* 6/2003 O'Leary ............... G06F 3/0483
715/700
2006/0103891 A1* 5/2006 Atkins ............... H04N 1/00132
358/450

(Continued)

FOREIGN PATENT DOCUMENTS

JP 2000-108467 A 4/2000
JP 2004-102614 A 4/2004

(Continued)

OTHER PUBLICATIONS

Search Report issued in corresponding International Patent Application No. PCT/JP2016/059854, dated May 10, 2016.

*Primary Examiner* — Thomas D Lee
(74) *Attorney, Agent, or Firm* — McDermott Will & Emery LLP

(57) ABSTRACT

A largest page size obtaining unit obtains a largest page size of a printed matter based on manuscript data. A RIP processing unit generates a page image in a bitmap format for each page based on the manuscript data. A position determining unit determines a position within a reference page having the largest page size for each page based on the manuscript data. A display image generating unit generates a display image including a page image of a spread page by arranging the page image to be displayed at the position determined by the position determining unit. A display unit displays the generated display image. With this, there is provided an image display device which correctly displays the printed matter including pages of different sizes.

13 Claims, 12 Drawing Sheets

(56) References Cited

U.S. PATENT DOCUMENTS

| | | | |
|---|---|---|---|
| 2012/0195715 A1* | 8/2012 | Watanabe | G06F 3/1208 412/11 |
| 2013/0201521 A1* | 8/2013 | Tsunekawa | H04N 1/00442 358/1.15 |
| 2017/0038930 A1* | 2/2017 | Hayakawa | G06F 3/0483 |

FOREIGN PATENT DOCUMENTS

| | | |
|---|---|---|
| JP | 2008-302518 A | 12/2008 |
| JP | 2010-028255 A | 2/2010 |
| JP | 2012-178144 A | 9/2012 |
| JP | 2013-254464 A | 12/2013 |

* cited by examiner

Fig. 9
(a) 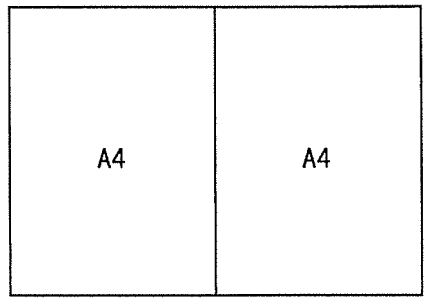
(b) 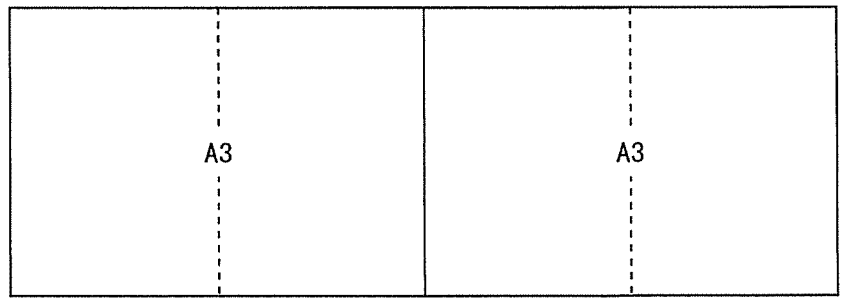
(c) 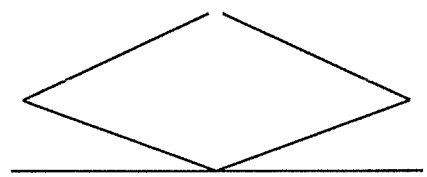

IMAGE DISPLAY DEVICE, IMAGE DISPLAY METHOD, AND RECORDING MEDIA HAVING RECORDED THEREON IMAGE DISPLAY PROGRAM

CROSS REFERENCE

This application is the U.S. National Phase under 35 US.C. § 371 of International Application No. PCT/JP2016/059854, filed on Mar. 28, 2016, which claims the benefit of Japanese Application No. 2015-172492, filed on Sep. 2, 2015, the entire contents of each are hereby incorporated by reference.

TECHNICAL FIELD

The present invention relates to an image display device, and especially to an image display device, an image display method, and an image display program for displaying a spread image of a printed matter.

BACKGROUND ART

A printing machine is used when printing various kinds of printed matters such as a book, a magazine, a catalog, and a brochure. Recently, in order to check a print result before printing, there is sometimes used an image display device for displaying an image showing the printed matter in a state where pages are opened (hereinafter referred to as a spread image of the printed matter), based on manuscript data of the printed matter.

Related to the present invention, Patent Document 1 discloses an image display device including a specifying means for specifying finish information concerning printing and binding of a booklet, and a display means for displaying a booklet image generated by simulating a physical form of the booklet which is obtained in accordance with the finish information. According to the image display device disclosed in Patent Document 1, it is possible to see a finish state of the booklet without generating the booklet in actual and see an appearance of the booklet in a short time and at a low cost.

PRIOR ART DOCUMENT

Patent Document

[Patent Document 1] Japanese Laid-Open Patent Publication No. 2000-108467

SUMMARY OF THE INVENTION

Problems to be Solved by the Invention

A size of a page included in the printed matter is B4, A4, B5, A5, or the like, for example. In the following description, it is assumed that B4 and B5 mean sizes prescribed in the Japanese Industrial Standards. However, it is possible to assume that B4 and B5 mean sizes prescribed in the ISO 216. Page sizes are all the same in many printed matters. However, there exist printed matters including pages of different sizes. For example, as shown in FIG. 15, a brochure having A4-sized pages 91 may include B5-sized saddle-stitched pages 92. Conventional image display devices for displaying the spread image of the printed matter has a problem that it can not correctly display the printed matter including pages of different sizes.

Accordingly, an object of the present invention is to provide an image display device capable of correctly displaying the printed matter including pages of different sizes.

Means for Solving the Problems

According to a first aspect of the present invention, there is provided an image display device for displaying a spread image of a printed matter, the device including: a largest page size obtaining unit configured to obtain a largest page size of the printed matter based on manuscript data of the printed matter; a position determining unit configured to determine a position within a reference page having the largest page size for each page included in the printed matter based on the manuscript data; a display image generating unit configured to generate a display image including a page image of a spread page by arranging the page image to be displayed at the position determined by the position determining unit; and a display unit configured to display the display image.

According to a second aspect of the present invention, in the first aspect of the present invention, the image display device further includes a page image generating unit configured to generate the page image in a bitmap format for each page included in the printed matter based on the manuscript data.

According to a third aspect of the present invention, in the first aspect of the present invention, the image display device further includes an instruction input unit configured to input an instruction, wherein when a page turning instruction is input using the instruction input unit, the display image generating unit is configured to generate an image showing a state in middle of turning a page as the display image.

According to a fourth aspect of the present invention, in the first aspect of the present invention, the position determining unit is configure to determine the position of each page within the reference page in accordance with whether to represent folded pages.

According to a fifth aspect of the present invention, there is provided an image display method for displaying a spread image of a printed matter, the method including: a largest page size obtaining step for obtaining a largest page size of the printed matter based on manuscript data of the printed matter; a position determining step for determining a position within a reference page having the largest page size for each page included in the printed matter based on the manuscript data; and a display image generating step for generating a display image including a page image of a spread page by arranging the page image to be displayed at the position determined in the position determining step.

According to a sixth aspect of the present invention, there is provided an image display program for displaying a spread image of a printed matter, the program causing a computer to execute, by a CPU using a memory: a largest page size obtaining step for obtaining a largest page size of the printed matter based on manuscript data of the printed matter; a position determining step for determining a position within a reference page having the largest page size for each page included in the printed matter based on the manuscript data; and a display image generating step for generating a display image including a page image of a spread page by arranging the page image to be displayed at the position determined in the position determining step.

According to a seventh aspect of the present invention, in the sixth aspect of the present invention, the program further causing the computer to execute a page image generating step for generating the page image in a bitmap format for each page included in the printed matter based on the manuscript data.

According to an eighth aspect of the present invention, in the sixth aspect of the present invention, the program further causing the computer to execute an instruction input step for inputting an instruction, and in the display image generating step, when a page turning instruction is input using the instruction input step, an image showing a state in middle of turning a page is generated as the display image.

According to a ninth aspect of the present invention, in the sixth aspect of the present invention, in the position determining step, the position of each page within the reference page is determined in accordance with whether to represent folded pages.

Effects of the Invention

According to the first, fifth or sixth aspect of the present invention, it is possible to correctly display the printed matter including pages of different sizes and check a print result before printing, by determining the position within the reference page having the largest page size of the printed matter and arranging the page image to be displayed at the determined position for each page included in the printed matter.

According to the second or seventh aspect of the present invention, it is possible to generate the page image in the bitmap format and correctly display the printed matter including the pages of different sizes.

According to the third or eighth aspect of the present invention, it is possible to correctly display the printed matter including the pages of different sizes, with displaying an image in the middle of turning a page.

According to the fourth or ninth aspect of the present invention, it is possible to correctly display the printed matter including the folded pages, with switching the display image in accordance with whether to represent the folded pages.

BRIEF DESCRIPTION OF THE DRAWINGS

FIG. 9 is a diagram showing a brochure having double gatefold pages.

MODES FOR CARRYING OUT THE INVENTION

Figure 1:
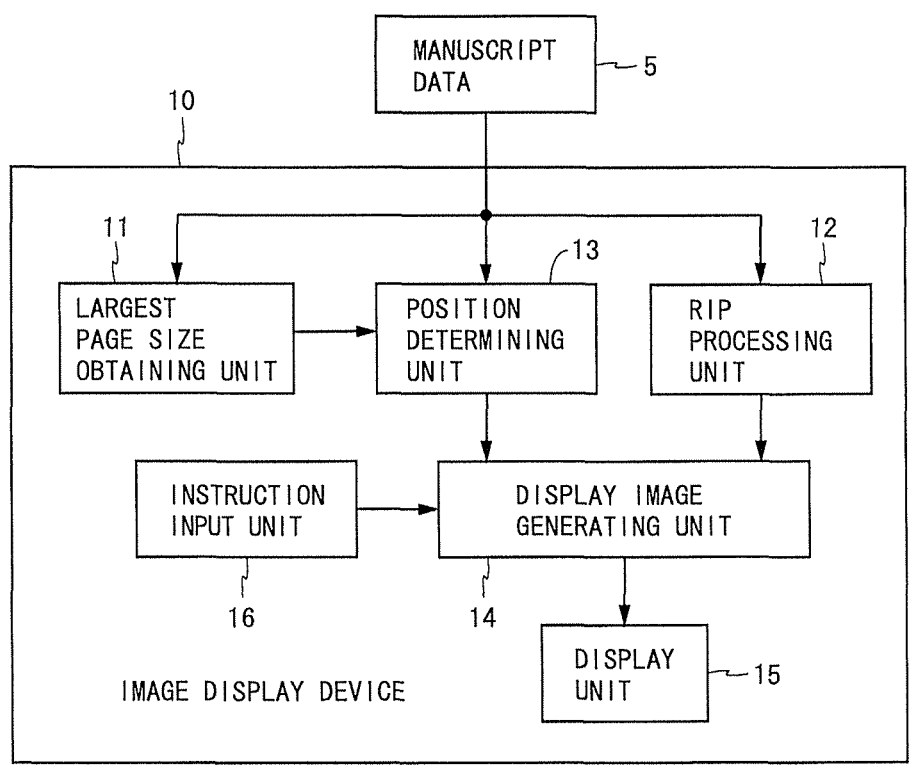
FIG. 1 is a block diagram showing a configuration of an image display device according to a first embodiment of the present invention.

Hereinafter, an image display device, an image display method, and an image display program according to each embodiment of the present invention will be described referring to the drawings. The image display device according to each embodiment of the present invention is typically configured using a computer. The image display method according to each embodiment of the present invention is typically executed using a computer. The image display program according to each embodiment of the present invention is a program for executing the image display method using a computer. A computer executing the image display program functions as the image display device.

First Embodiment

FIG. 1 is a block diagram showing a configuration of an image display device according to a first embodiment of the present invention. An image display device 10 shown in FIG. 1 includes a largest page size obtaining unit 11, a RIP (Raster Image Processing) processing unit 12, a position determining unit 13, a display image generating unit 14, a display unit 15, and an instruction input unit 16. Manuscript data 5 of a printed matter is input to the image display device 10. The image display device 10 displays a spread image of the printed matter based on the manuscript data 5.

The largest page size obtaining unit 11 obtains a largest page size of the printed matter (size of a largest page included in the printed matter) based on the manuscript data 5. Based on the manuscript data 5, the RIP processing unit 12 generates a page image in a bitmap format for each page included in the printed matter. The RIP processing unit 12 functions as a page image generating unit. Based on the manuscript data 5, the position determining unit 13 determines a position within a reference page having the largest page size for each page included in the printed matter. The display image generating unit 14 generates a display image including the page image of a spread page by arranging the page image to be displayed at the position determined by the position determining unit 13. The display unit 15 displays the display image generated by the display image generating unit 14. The instruction input unit 16 has a function for inputting an instruction from a user. When a page turning instruction is input using the instruction input unit 16, the display image generating unit 14 generates an image showing a state in the middle of turning a page as the display image.

Figure 2:
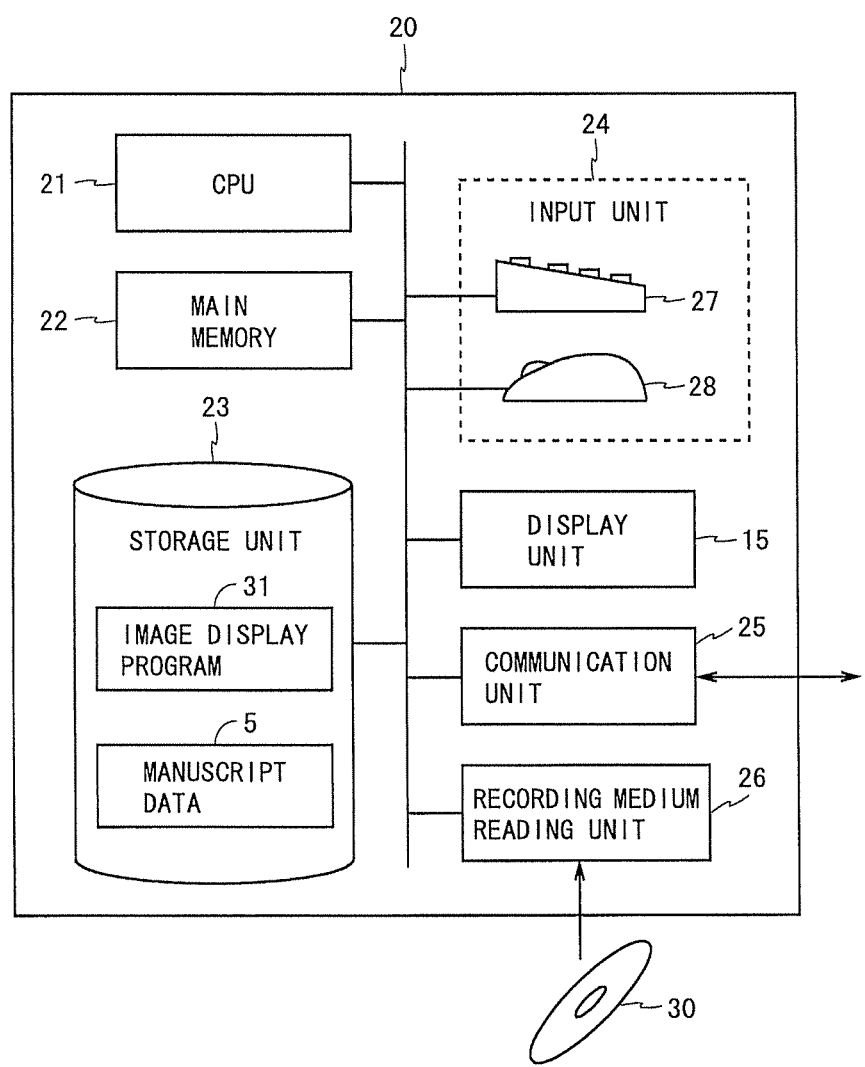
FIG. 2 is a block diagram showing a configuration of a computer functioning as the image display device according to the first embodiment.

The image display device 10 is configured using a computer 20 shown in FIG. 2, for example. FIG. 2 is a block diagram showing a configuration of a computer functioning as the image display device 10. The computer 20 shown in FIG. 2 includes a CPU 21, a main memory 22, a storage unit 23, an input unit 24, the display unit 15, a communication unit 25, and a recording medium reading unit 26. As the main memory 22, a DRAM is used, for example. As the storage unit 23, a hard disk or a solid state drive is used, for example. The input unit 24 includes a keyboard 27 and a mouse 28, for example. As the display unit 15, a liquid crystal display is used, for example. The communication unit 25 is an interface circuit for wired communication or wireless communication. The recording medium reading unit 26 is an interface circuit of a recording medium 30 for recording programs or the like. As the recording medium 30, a non-transitory recording medium such as CD-ROM, DVD-ROM or the like is used, for example. Note that the above-described configuration of the computer 20 is merely an example and the image display device 10 can be configured using an arbitrary computer.

In the following, there will be described a case in which the computer 20 functions as the image display device 10. In this case, the storage unit 23 stores an image display program 31, and the manuscript data 5 to be processed by the image display program 31. For example, the image display program 31 may be received from a server or another computer using the communication unit 25, or may be read from the recording medium 30 using the recording medium reading unit 26. The manuscript data 5 may be received from an equipment, a device, or another computer using the communication unit 25, may be read from the recording medium 30 using the recording medium reading unit 26, or may be input by the user using the input unit 24.

When the image display program 31 is executed, the image display program 31 and the manuscript data 5 are copied and transferred to the main memory 22. The CPU 21 processes the manuscript data 5 stored in the main memory 22 by executing the image display program 31 stored in the main memory 22 using the main memory 22 as a working memory. At this time, the computer 20 functions as the image display device 10.

Figure 3:
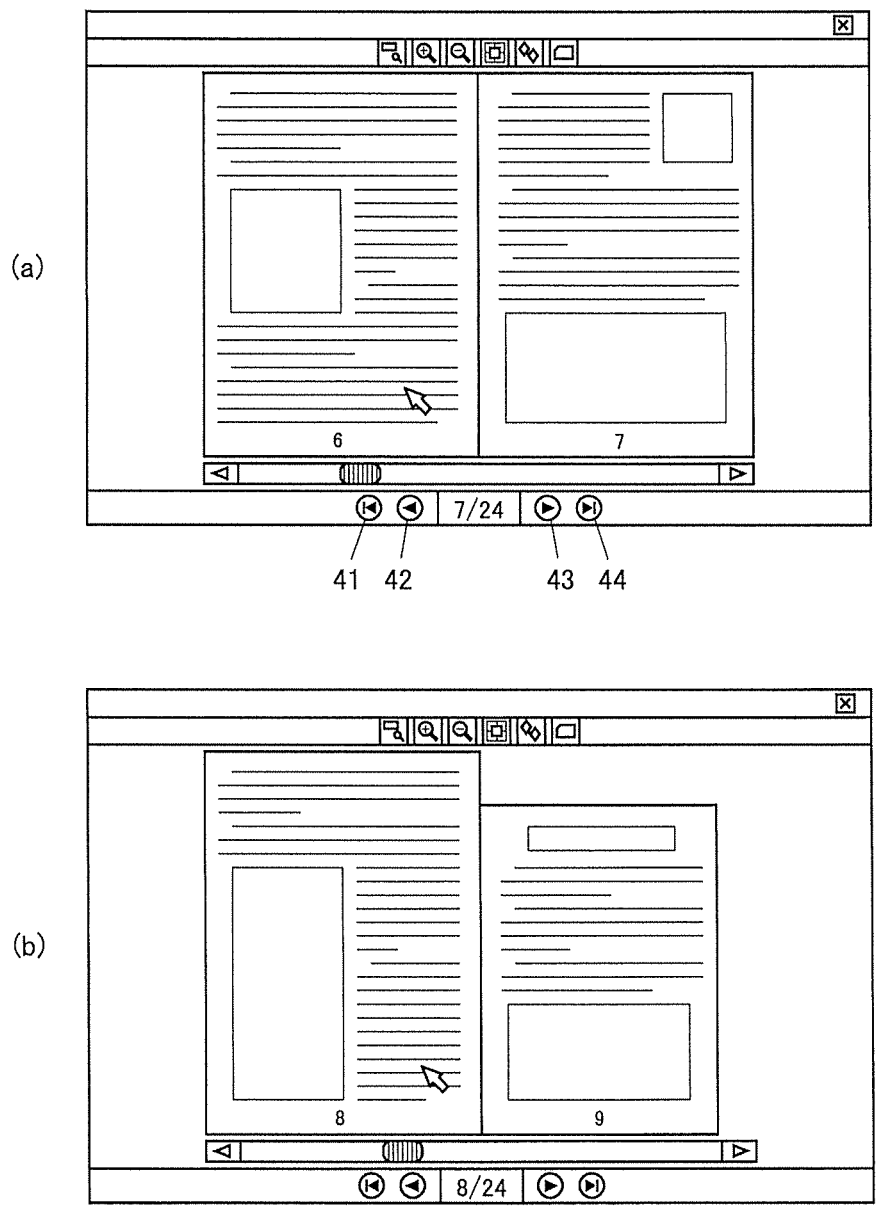
FIG. 3 is a diagram showing an example of a display screen of the image display device according to the first embodiment.

FIG. 3 is a diagram showing an example of a display screen of the image display device 10. In each screen shown in FIG. 3, a brochure in a state where pages are opened is displayed. In the screen shown in FIG. 3(a), sixth and seventh pages of the brochure are displayed. The size of the sixth and seventh pages is A4. In the screen shown in FIG. 3(a), buttons 41 to 44 for instructing first page, left page, right page, and last page are displayed. The user selects the buttons 41 to 44 using the mouse 28, for example. When the button 43 for instructing right page is selected while the screen shown in FIG. 3(a) is displayed, a page turning process is performed and the screen shown in FIG. 3(b) is displayed. In the screen shown in FIG. 3(b), eighth and ninth pages of the brochure are displayed. The size of the eighth page is A4, whereas the size of the ninth page is B5. The ninth page is displayed so that a lower-left vertex overlaps with a lower-right vertex of the eighth page in accordance with a physical structure of the brochure.

Figure 4:
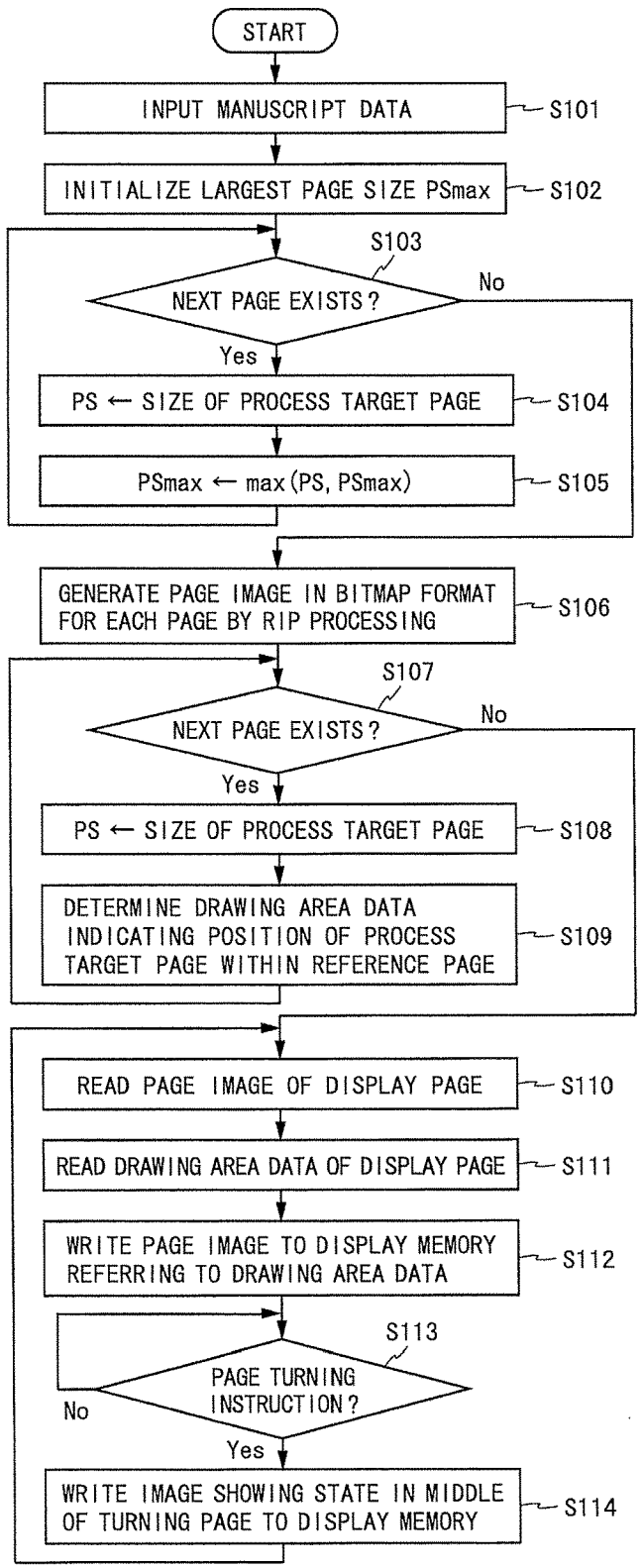
FIG. 4 is a flowchart showing an operation of the image display device according to the first embodiment.

FIG. 4 is a flowchart showing an operation of the image display device 10. The process shown in FIG. 4 is performed by the CPU 21 executing the image display program 31 using the main memory 22.

At first, the manuscript data 5 which is a process target is input to the image display device 10 (step S101). The manuscript data 5 may be, for example, data described using a page description language or data conforming to an electronic document file format. Specifically, the manuscript data 5 may be data described using PostScript (registered trademark), or may be PDF (Portable Document Format) data. The manuscript data 5 includes data concerning each page included in the printed matter. The data of each page includes data indicating contents of the page, a page size, and the like. The page size may be a standard size such as B4, A4, B5, or, A5, or may be any other sizes. The page size of the printed matter may all be the same, or the printed matter may include pages of different sizes.

Next, the CPU 21 obtains the largest page size of the printed matter based on the manuscript data 5. More specifically, the CPU 21 initializes a largest page size PSmax to a sufficiently small size (for example, zero) (step S102). Next, the CPU 21 determines whether a next page exists (step S103). If Yes is determined in step S103, the CPU 21 goes to step S104. In this case, the CPU 21 selects the next page as a process target page and extracts a size PS of the process target page from the manuscript data 5 (step S104). Next, the CPU 21 compares the extracted page size PS with the largest page size PSmax and sets a larger one (more accurately, not smaller one) to the largest page size PSmax (step S105). Next, the CPU 21 goes to step S103.

If No is determined in step S103, the CPU 21 goes to step S106. In this case, the CPU 21 performs a RIP processing on the manuscript data 5 to generate the page image in the bitmap format for each page included in the printed matter based on the manuscript data 5 (step S106). The page images generated in step S106 are stored in the main memory 22 or the storage unit 23.

Hereinafter, a page having the largest page size PSmax is referred to as a reference page. For example, when the printed matter includes A4-sized pages and B5-sized pages, an A4-sized page is determined as the reference page. The reference page is a virtual page used for displaying the printed matter including pages of different sizes, and does not indicate a specific page included in the printed matter.

Next, based on the manuscript data 5, the CPU 21 determines a position within the reference page for each page included in the printed matter. More specifically, the CPU 21 determines whether a next page exists (step S107). If Yes is determined in step S107, the CPU 21 goes to step S108. In this case, the CPU 21 selects the next page as the process target page and extracts the size PS of the process target page from the manuscript data 5 (step S108). Next, the CPU 21 determines drawing area data indicating the position of the process target page within the reference page, based on the largest page size PSmax, the extracted page size PS, a page number, and the like (step S109, details will be described later). Next, the CPU 21 goes to step S107.

If No is determined in step S107, the CPU 21 goes to step S110. In this case, the CPU 21 generates the display image including the page image of the spread page by arranging the page image to be displayed at the position determined in step S109. More specifically, the CPU 21 reads the page image of the page to be displayed and writes the page image in a predetermined area of the main memory 22 (step S110). Next, the CPU 21 reads the drawing area data of the page to be displayed and writes the drawing area data in another predetermined area of the main memory 22 (step S111). Next, the CPU 21 writes the page image of the page to be displayed to a display memory (not shown) set in the main memory 22, referring to the drawing area data (step S112).

When the page images of the spread pages are to be displayed, the CPU 21 executes steps S110 to S112 for each page. With this, the display image including the page images of the spread pages is written to the display memory. The display unit 15 displays the display image stored in the display memory. With this, the image display device 10 displays the spread image of the printed matter.

Next, the CPU 21 waits until a page turning instruction is input using the input unit 24 or the like (step S113). When the page turning instruction is input, the CPU 21 writes an image showing a state in the middle of turning a page, to the display memory as the display image (step S114). With this, the image display device 10 displays the image showing the state in the middle of turning the page. Next, the CPU 21 goes to step S110.

Figure 5:
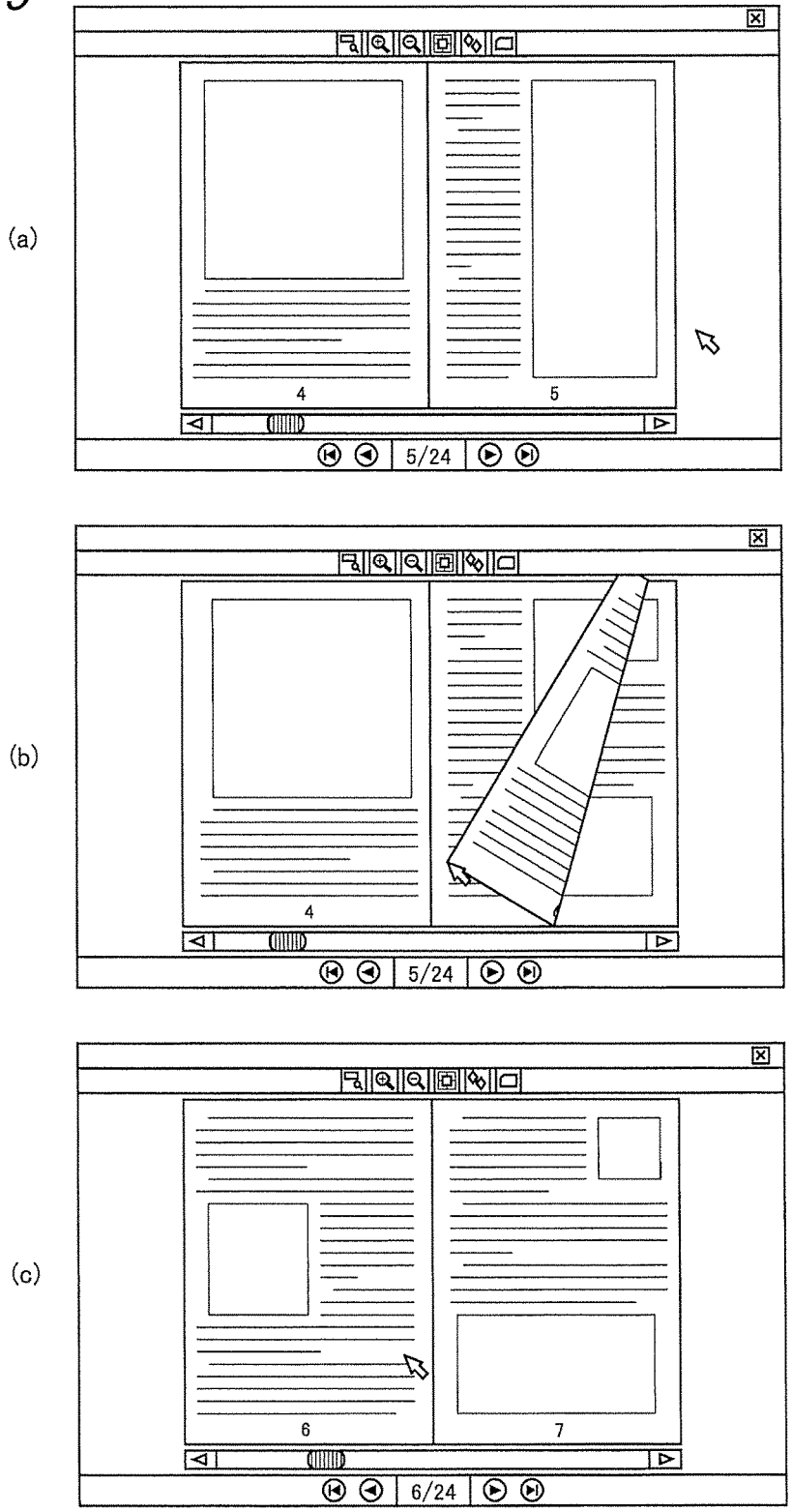
FIG. 5 is a diagram for explaining a page turning process by the image display device according to the first embodiment.

FIG. 5 is a diagram for explaining the page turning process by the image display device 10. In a screen shown in FIG. 5(*a*), fourth and fifth pages of the brochure are displayed. In a screen shown in FIG. 5(*c*), sixth and seventh pages of the brochure are displayed. In a screen shown in FIG. 5(*b*), a state in the middle of turning a page is displayed.

When the screen shown in FIG. 5(*a*) is to be displayed, the CPU 21 writes a page image of the fourth page and a page image of the fifth page to the display memory. Similarly, when the screen shown in FIG. 5(*c*) is to be displayed, the CPU 21 writes a page image of the sixth page and a page image of the seventh page to the display memory.

In the screen shown in FIG. 5(*b*), the entirety of the fourth page and a part of each of the fifth to the seventh pages are displayed. When the screen shown in FIG. 5(*b*) is to be displayed, the CPU 21 writes the entirety of the page image of the fourth page, a part of the page image of the seventh page which becomes visible because a page is turned, and a part of the page image of the fifth page excluding a part which becomes invisible because the page is turned, to the display memory in step S114. In addition, the CPU 21 rotates, by a predetermined angle, a part of the page image of the sixth page which becomes visible because the page is turned, and writes the rotated part to the display memory.

Elements of the computer 20 shown in FIG. 2 and steps shown in FIG. 4 are corresponded to elements of the image display device 10 shown in FIG. 1 as follows. The CPU 21 executing steps S102 to S105 functions as the largest page size obtaining unit 11. The CPU 21 executing step S106 functions as the RIP processing unit 12. The CPU 21 executing steps S107 to S109 functions as the position determining unit 13. The CPU 21 executing steps S110 to S112 and S114 functions as the display image generating unit 14. The input unit 24 functions as the instruction input unit 16.

Figure 6:
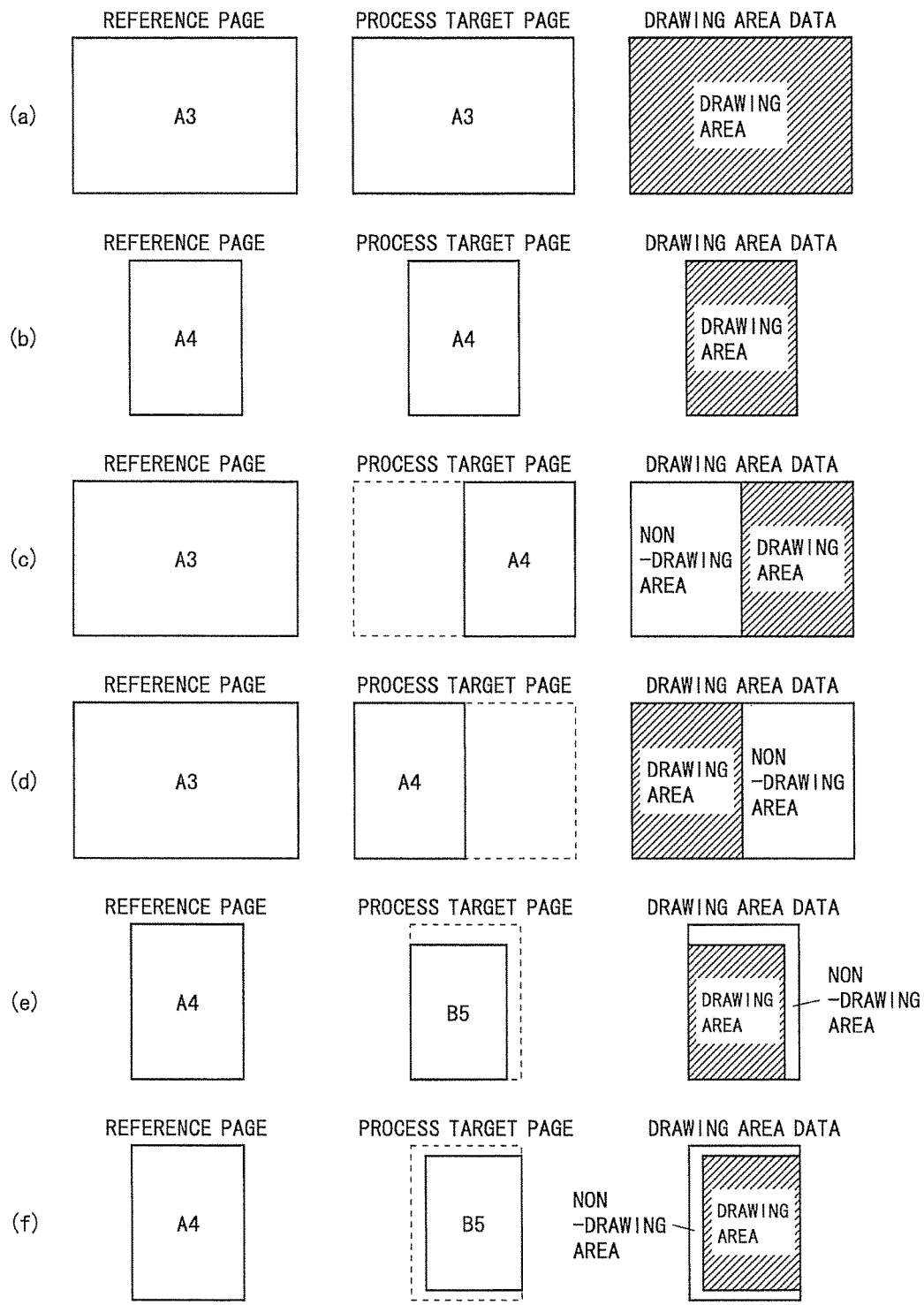
FIG. 6 is a diagram showing drawing area data in the image display device according to the first embodiment.

FIG. 6 is a diagram showing the drawing area data in the image display device 10. As state above, in step S109, the CPU 21 determines the drawing area data indicating the position of the process target page within the reference page, based on the largest page size (size of reference page) obtained in steps S102 to S105, the page size (size of process target page) extracted in step S108, the page number, and the like. The drawing area data includes one bit data, the number of which is equal to that of the pixels included in the reference page. In the drawing area data shown in FIG. 6, a hatched part represents a drawing area and a white-painted part represents a non-drawing area.

When the size of the process target page is the same as the size of the reference page, the entire drawing area data becomes the drawing area. For example, when both the size of the reference page and the size of the process target page are A3, the entire drawing area data corresponding to A3 size becomes the drawing area (FIG. 6(*a*)). When both the size of the reference page and the size of the process target page are A4, the entire drawing area data corresponding to A4 size becomes the drawing area (FIG. 6(*b*)).

When the size of the process target page is smaller than the size of the reference page, a part of the drawing area data becomes the drawing area. Which part of the drawing area data becomes the drawing area is determined based on a binding method (left binding or right binding), the page number, a binding position, and the like. In the following, there will be described a case where the printed matter is left-bound. For example, when the size of the reference page is A3, the size of the process target page is A4, and the process target page is a left-side page, a right half of the drawing area data corresponding to A3 size becomes the drawing area (FIG. 6(*c*)). When the size of the reference page is A3, the size of the process target page is A4, and the process target page is a right-side page, a left half of the drawing area data corresponding to A3 size becomes the drawing area (FIG. 6(*d*)). When the size of the reference page is A4, the size of the process target page is B5, the process target page is a right-side page, and the binding position is "low", a lower-left part of the drawing area data corresponding to A4 size becomes the drawing area (FIG. 6(*e*)). When the size of the reference page is A4, the size of the process target page is B5, the process target page is a left-side page, and the binding position is "center", a center-right part of the drawing area data corresponding to A4 size becomes the drawing area (FIG. 6(*f*)).

Figure 7:
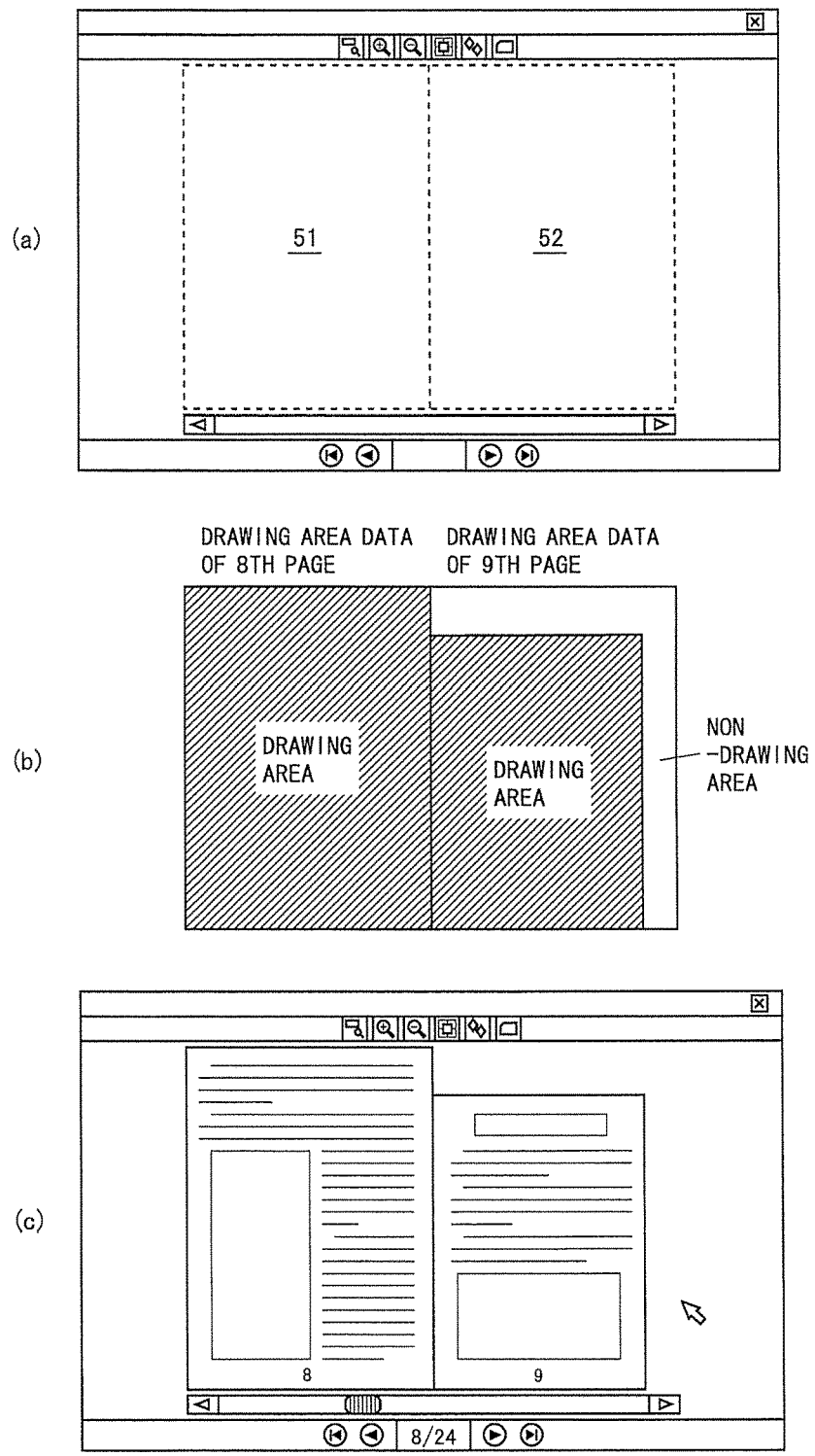
FIG. 7 is a diagram showing a method for generating a display image in the image display device according to the first embodiment.

FIG. 7 is a diagram for explaining a method for generating the display image in the image display device 10. In order to display the spread image of the printed matter, two display areas corresponding to two reference pages are set in the display screen (FIG. 7(*a*)). More specifically, a display area 51 corresponding to a left-side page and a display area 52 corresponding to a right-side page are set in the display screen. The display memory has a part corresponding to the display area 51 and a part corresponding to the display area 52.

For example, when the size of the reference page is A4, the size of the eighth page is A4, the size of the ninth page is B5, and the binding position of the ninth page is "low", the entire drawing area data becomes the drawing area for the eighth page, and a lower-left part of the drawing area data becomes the drawing area for the ninth page (FIG. 7(*b*)).

As stated above, the CPU 21 writes the page image of the page to be displayed to the display memory, referring to the drawing area data in step S112. In the example shown in FIG. 7, the CPU 21 writes the page image of the eighth page at the part corresponding to the display area 51 of the display memory, and writes the page image of the ninth page to the lower-left part corresponding to the display area 52 of the display memory. At this time, the display unit 15 displays the A4-sized eighth page and the B5-sized ninth page (FIG. 7(*c*)). In the screen shown in FIG. 7(*c*), the ninth page is displayed so that the lower-left vertex overlaps with the lower-right vertex of the eighth page in accordance with the physical structure of the brochure. Therefore, according to the image display device 10, it is possible to correctly display the printed matter including pages of different sizes in the screen and check a print result before printing.

As described above, the image display device 10 according to the present embodiment includes the largest page size obtaining unit 11, a page image generating unit (RIP processing unit 12), the position determining unit 13, the display image generating unit 14, the display unit 15, and the instruction input unit 16.

For each page included in the printed matter, the image display device 10 determines the position within the reference page having the largest page size of the printed matter and arranges the page image to be displayed at the determined position. Therefore, according to the image display device 10, it is possible to correctly display the printed matter including the pages of the different sizes and check the print result before printing. Furthermore, according to the image display device 10, it is possible to generate the page image in the bitmap format and display the image in the middle of turning a page.

Second Embodiment

An image display device according to a second embodiment of the present invention has a same configuration as that of the image display device according to the first embodiment (see FIGS. 1 and 2). The image display device according to the present embodiment is obtained by adding a process concerning folded pages to the image display device 10 according to the first embodiment.

Hereinafter, when a printed matter includes folded pages, displaying the folded pages in a folded state is referred to as "representing folded pages", and displaying the folded pages in an extended state is referred to as "not representing folded pages". Whether to represent the folded pages is specified by the user. The image display device according to the present embodiment performs different operations between when not representing the folded pages and when representing the folded pages.

Figure 8:
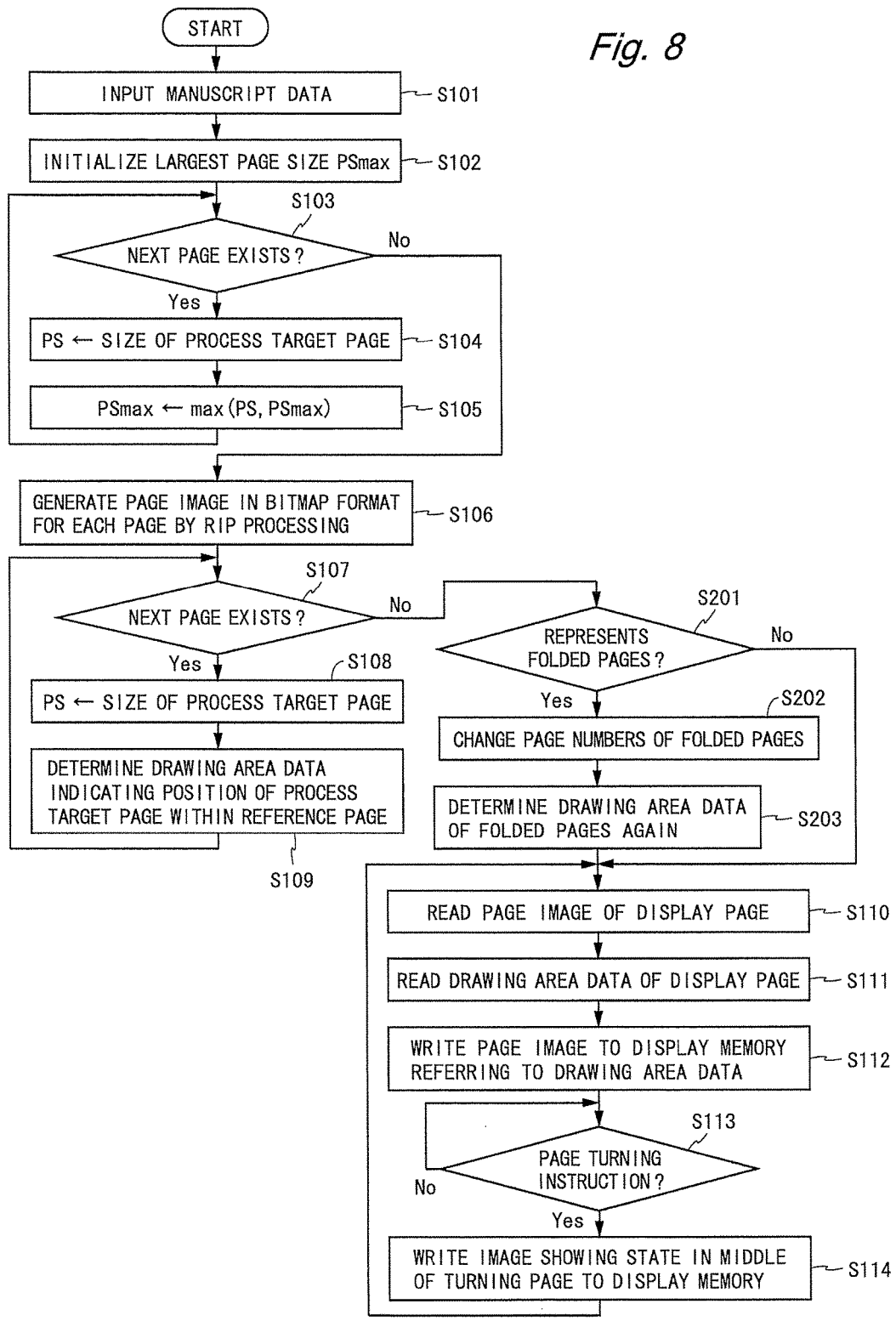
FIG. 8 is a flowchart showing an operation of an image display device according to a second embodiment of the present invention.

FIG. 8 is a flowchart showing an operation of the image display device according to the present embodiment. The flowchart shown in FIG. 8 is obtained by adding steps S201 to S203 to the flowchart shown in FIG. 4. The CPU 21 executing steps S201 and S203 functions as the position determining unit 13.

In the image display device according to the present embodiment, when No is determined in step S107, the CPU 21 goes to step S201. In this case, the CPU 21 determines whether to represent the folded pages (step S201). If No is determined in step S201, the CPU 21 goes to step S110 without executing steps S202 and S203. In this case, the image display device according to the present embodiment performs the same operation as that of the image display device 10 according to the first embodiment.

If Yes is determined in step S201, the CPU 21 goes to step S202. In this case, the CPU 21 changes page numbers of the folded pages (step S202) and determines the drawing area data of the folded pages again (step S203). Next, the CPU 21 goes to step S110. In this manner, the CPU 21 determines the drawing area data indicating the position of each page within the reference page in accordance with whether to represent the folded pages.

In the following, a brochure having double gatefold pages is explained as an example of the printed matter having the folded pages. FIG. 9 is a diagram showing the brochure having the double gatefold pages. Here, it is assumed that the size of the normal pages included in the brochure is A4 and the size of the double gatefold pages is A3. FIG. 9(*a*) shows a state where the double gatefold pages are folded. FIG. 9(*b*) shows a state where the double gatefold pages are extended. FIG. 9(*c*) shows a state where the double gatefold pages are seen from a bottom side.

Figure 10:
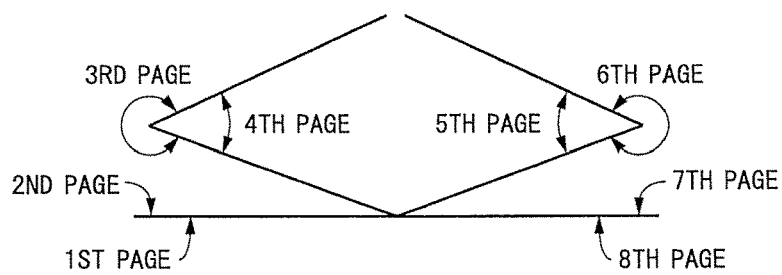
FIG. 10 is a diagram showing a page allocation for the brochure shown in FIG. 9 when folded pages are not represented.

FIG. 10 is a diagram showing a page allocation when the folded pages are not represented. In this case, the size of first, second, seventh, and eighth pages is A4 and the size of third to sixth pages is A3. Back pages of the first, third, fifth, and seventh pages are the second, fourth, sixth, and eighth pages, respectively.

Figure 11:
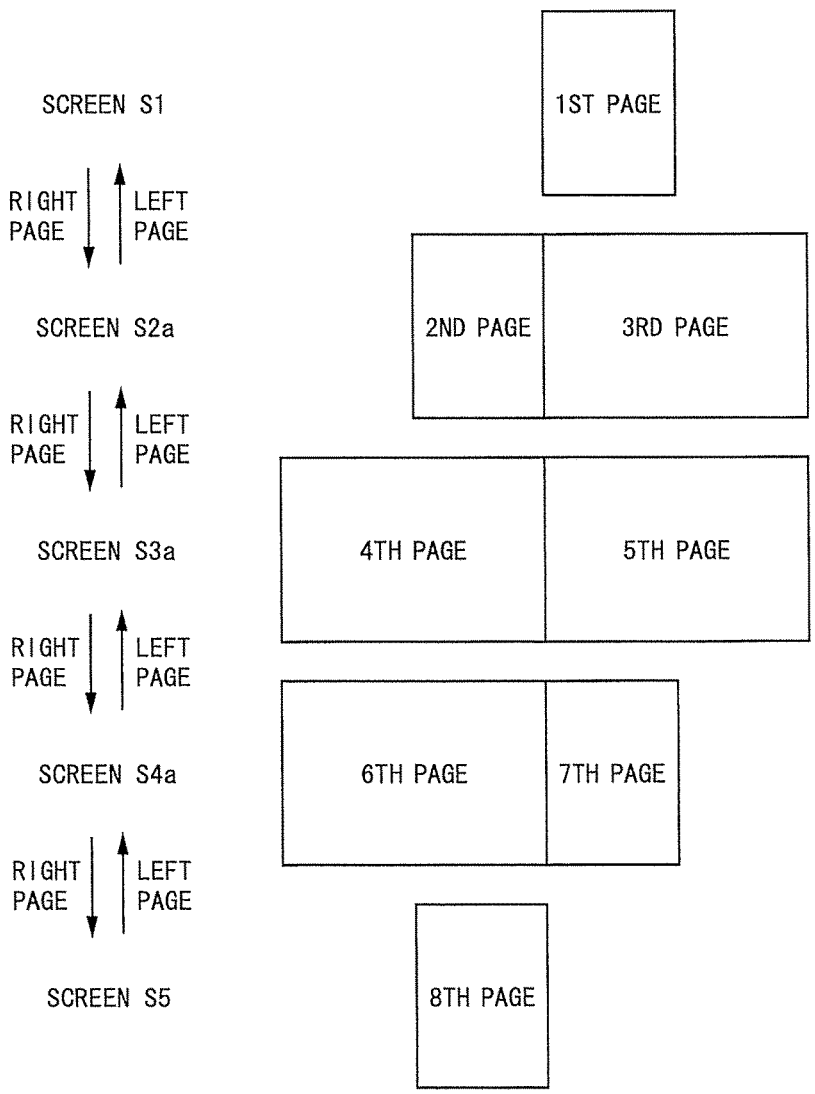
FIG. 11 is a diagram showing changes in a display screen when the folded pages are not represented in the image display device according to the second embodiment.

FIG. 11 is a diagram showing changes in a display screen when the folded pages are not represented. In the image display device according to the present embodiment, at first, the first page is displayed alone (screen S1). When right page is instructed in the screen S1, the A4-sized second page and the A3-sized third page are displayed (screen S2*a*). When right page is instructed in the screen S2*a*, the A3-sized fourth page and the A3-sized fifth page are displayed (screen S3*a*). When right page is instructed in the screen S1*a*, the A3-sized sixth page and the A4-sized seventh page are displayed (screen S4*a*). When right page is instructed in the screen S4*a*, the A4-sized eighth page is displayed alone (screen S5).

Figure 12:
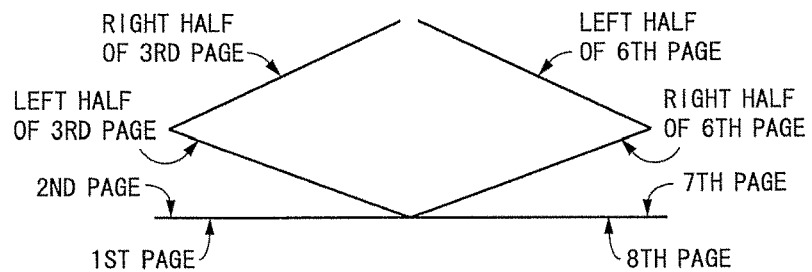
FIG. 12 is a diagram showing the page allocation for the brochure shown in FIG. 9 when the folded pages are represented.

FIG. 12 is a diagram showing the page allocation when the folded pages are represented. In this case, as in the case of not representing the folded pages, the size of the first, second, seventh, and eighth pages is A4, and the back pages of the first and seventh pages are the second and eighth pages, respectively. On the other hand, unlike in the case of not representing the folded pages, the third and sixth pages are respectively divided into two parts, a left half and a right half. The size of the divided two pages is A4. A back page of a left half of the third page is a right half of the third page, and a back page of a left half of the sixth page is a right half of the sixth page. Thus, in the image display device according to the present embodiment, the CPU 21 changes page numbers of the left half of the third page, the right half of the third page, the left half of the sixth page, and the right half page of the sixth page to the third to sixth pages, respectively in step S202.

Figure 13:
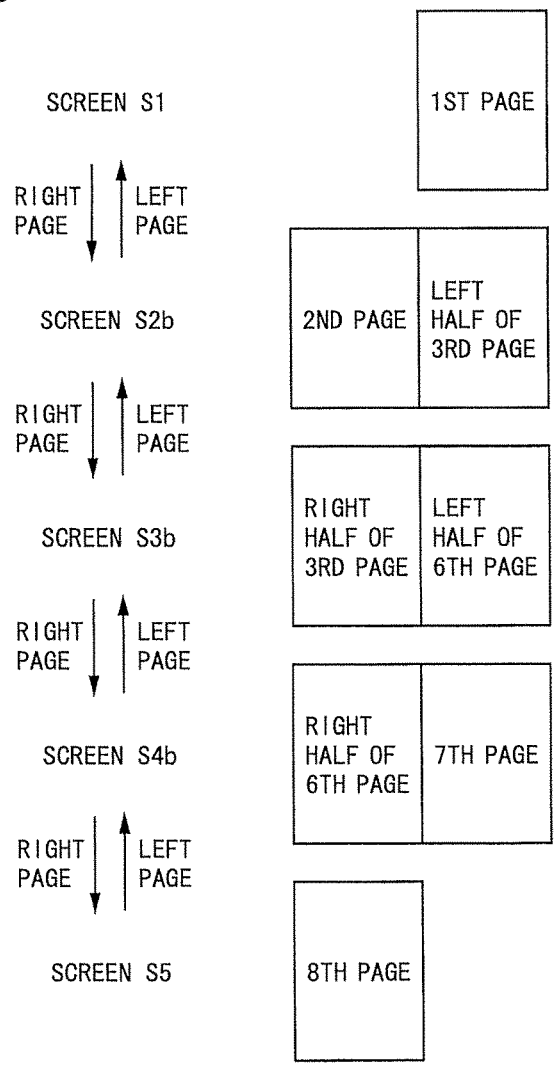
FIG. 13 is a diagram showing changes in the display screen when the folded pages are represented in the image display device according to the second embodiment.

FIG. 13 is a diagram showing changes in the display screen when representing the folded pages. In this case, when right page is instructed in the screen S1, the A4-sized second page and the left half (size is A4) of the third page are displayed (screen S2*b*). When right page is instructed in the screen S2*b*, the right half (size is A4) of the third page and the left half (size is A4) of the sixth page are displayed (screen S3*b*). When right page is instructed in the screen S3*b*, the right half (size is A4) of the sixth page and the A4-sized seventh page are displayed (screen S4*b*). When right page is instructed in the screen S4*b*, the A4-sized eighth page is displayed alone (screen S5).

Figure 14:
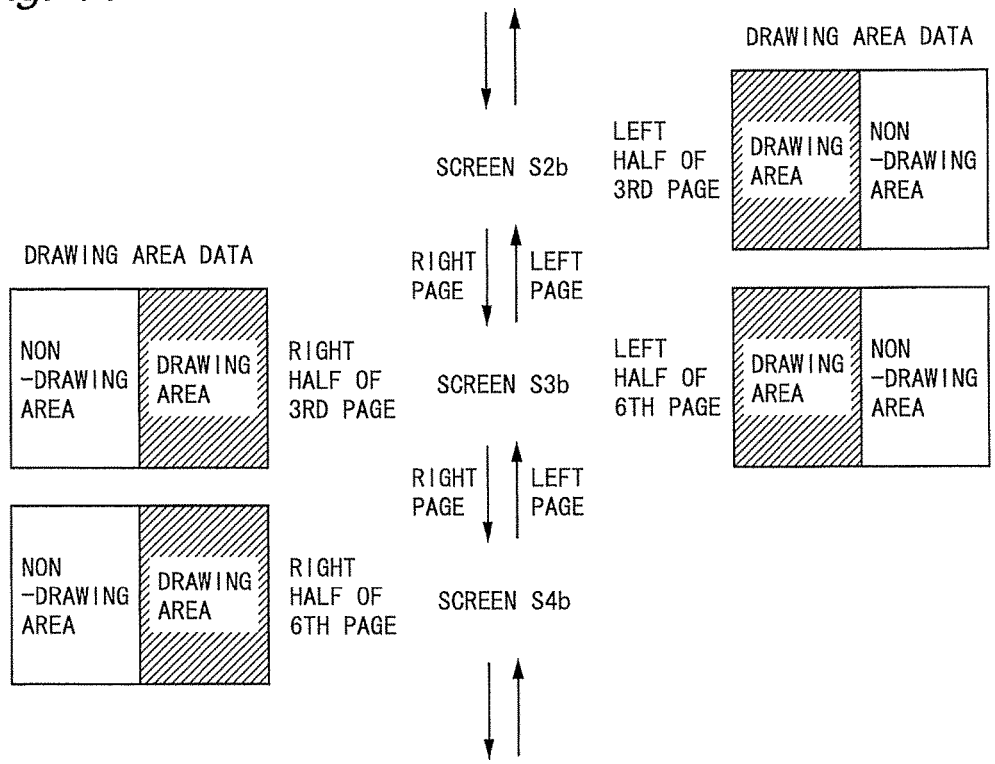
FIG. 14 is a diagram showing drawing area data in the image display device according to the second embodiment when the folded pages are represented.
Figure 15:
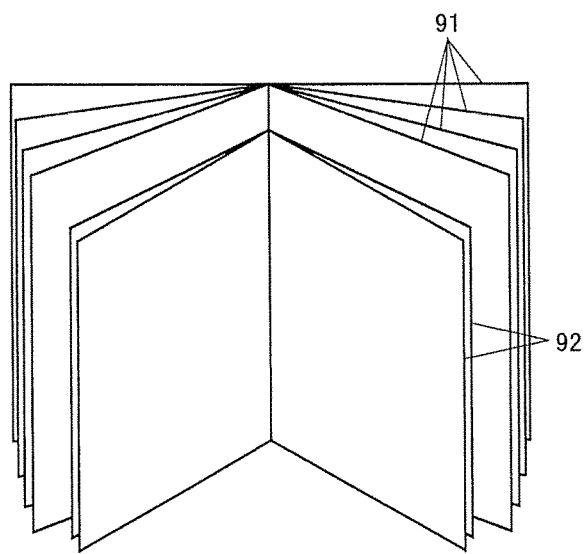
FIG. 15 is a diagram showing a brochure including pages of different sizes.

In the image display device according to the present embodiment, the CPU 21 determines the drawing area data of the folded pages again in step S203. FIG. 14 is a diagram showing the drawing area data when representing the folded pages. As shown in FIG. 14, when the left half of the third or sixth page is to be displayed, a left half of the drawing area data corresponding to A3 size becomes the drawing area. When the right half of the third or sixth page is to be displayed, a right half of the drawing area data corresponding to A3 size becomes the drawing area. With this, the image display device according to the present embodiment can change the display screen as shown in FIG. 13.

As described above, in the image display device according to the present embodiment, the position determining unit 13 determines the position of each page within the reference page in accordance with whether to represent the folded pages. Therefore, according to the image display device according to the present embodiment, it is possible to correctly display the printed matter including the folded pages, with switching the display image in accordance with whether to represent the folded pages.

In the flowchart shown in FIG. 8, the CPU 21 determines the drawing area data of the folded pages again in step S203 after obtaining the drawing area data in step S109. Alternatively, the CPU 21 may obtain the drawing area data of each page in accordance with whether to represent the folded pages by a method other than described above.

As described above, according to the image display device, the image display method, and the image display program of the present invention, it is possible to correctly display a printed matter including pages of different sizes and check a print result before printing.

INDUSTRIAL APPLICABILITY

Since the image display device, the image display method, and the image display program of the present invention have a feature that a printed matter including pages of different sizes can be displayed correctly, it is possible to use these with a printing machine for printing various kinds of printed matters, a control device of the printing machine, and the like.

DESCRIPTION OF REFERENCE CHARACTERS

5: MANUSCRIPT DATA
10: IMAGE DISPLAY DEVICE
11: LARGEST PAGE SIZE OBTAINING UNIT
12: RIP PROCESSING UNIT
13: POSITION DETERMINING UNIT
14: DISPLAY IMAGE GENERATING UNIT
15: DISPLAY UNIT
16: INSTRUCTION INPUT UNIT
20: COMPUTER
21: CPU
22: MAIN MEMORY
23: STORAGE UNIT
24: INPUT UNIT
30: RECORDING MEDIUM
31: IMAGE DISPLAY PROGRAM
41 to 44: BUTTON
51, 52: DISPLAY AREA

The invention claimed is:

1. A computer for processing a spread image of a printed matter including pages, at least two of which have different sizes, the computer comprising a processor configured to:
obtain a largest page size of the printed matter based on manuscript data of the printed matter, the largest page size being a size of a largest page of the pages included in the printed matter;
determine respective positions of the pages included in the printed matter based on the manuscript data within a reference page having the largest page size;
generate a display image including page images, each of the page images including only corresponding one of the pages included in the printed matter, and the pages being positioned in the page images, respectively, based on the positions determined with respect to the reference page; and
control a display to display the display image.

2. The computer according to claim 1, wherein the processor is further programmed to generate the page image in a bitmap format for each page included in the printed matter based on the manuscript data.

3. The computer according to claim 1, wherein the processor is further programmed:
when a page turning instruction is input, to generate an image showing a state in middle of turning a page as the display image.

4. The computer according to claim 1, wherein the processor is further programmed to determine the position of each page within the reference page in accordance with whether to display folded pages in a folded state or in an extended state.

5. The computer according to claim 1, wherein the processor is further programmed to determine the position of each page included in the printed matter within the reference page based on information about binding method, the information prepared for each page included in the printed matter.

6. The computer according to claim 5, wherein the information is used for determining the binding method to be either left binding or right binding for each page included in the printed matter.

7. The computer according to claim 1, wherein the processor is further programmed to determine the position of each page included in the printed matter within the reference page based on information about binding position, the information prepared for each page included in the printed matter.

8. The computer according to claim 7, wherein the information is used for determining the binding position to be one of high, low, and center for each page included in the printed matter.

9. An image display method for displaying a spread image of a printed matter including pages, at least two of which have different sizes, the method comprising:
obtaining a largest page size of the printed matter based on manuscript data of the printed matter, the largest page size being a size of a largest page of the pages included in the printed matter;
determining respective positions of the pages included in the printed matter based on the manuscript data within a reference page having the largest page size; and
generating a display image including page images, each of the page images including only corresponding one of the pages included in the printed matter, and the pages being positioned in the page images, respectively, based on the positions determined with respect to the reference page.

10. A non-transitory computer readable recording medium having recorded thereon an image display program for displaying a spread image of a printed matter including pages, at least two of which have different sizes, the program causing a computer to execute, by a CPU using a memory:
obtaining a largest page size of the printed matter based on manuscript data of the printed matter, the largest page size being a size of a largest page of the pages included in the printed matter;
determining respective positions of the pages included in the printed matter based on the manuscript data within a reference page having the largest page size; and
generating a display image including page images, each of the page images including only corresponding one of the pages included in the printed matter, and the pages being positioned in the page images, respectively, based on the positions determined with respect to the reference page.

11. The non-transitory computer readable recording medium according to claim 10, wherein the program further causing the computer to execute generating the page image in a bitmap format for each page included in the printed matter based on the manuscript data.

12. The non-transitory computer readable recording medium according to claim 10, wherein
the program further causing the computer to execute inputting an instruction, and when a page turning instruction is input, an image showing a state in middle of turning a page is generated as the display image.

13. The non-transitory computer readable recording medium according to claim 10, wherein the position of each page within the reference page is determined in accordance with whether to display folded pages in a folded state or in an extended state.

* * * * *